(12) United States Patent
Adachi et al.

(10) Patent No.: US 10,576,954 B2
(45) Date of Patent: Mar. 3, 2020

(54) BRAKE FLUID PRESSURE CONTROL UNIT, BRAKE SYSTEM FOR MOTORCYCLE, AND MOTORCYCLE

(71) Applicant: Robert Bosch GmbH, Stuttgart (DE)

(72) Inventors: Eiji Adachi, Kanagawa (JP); Hiroaki Atsushi, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/770,494

(22) PCT Filed: Nov. 3, 2016

(86) PCT No.: PCT/IB2016/056608
§ 371 (c)(1),
(2) Date: Apr. 23, 2018

(87) PCT Pub. No.: WO2017/081582
PCT Pub. Date: May 18, 2017

(65) Prior Publication Data
US 2019/0054908 A1 Feb. 21, 2019

(30) Foreign Application Priority Data
Nov. 9, 2015 (JP) .................................. 2015-219681

(51) Int. Cl.
*B60T 13/66* (2006.01)
*B60T 8/32* (2006.01)
(Continued)

(52) U.S. Cl.
CPC ............ *B60T 8/328* (2013.01); *B60T 8/4027* (2013.01); *B60T 8/3225* (2013.01); *B60T 8/3685* (2013.01); *B60T 8/4275* (2013.01)

(58) Field of Classification Search
CPC ...... B60T 8/328; B60T 8/1706; B60T 8/3225; B60T 8/3685; B60T 13/66
(Continued)

(56) References Cited

U.S. PATENT DOCUMENTS 4,090,739 A * 5/1978 Iio .......................... B60T 8/3225
303/10
4,480,877 A * 11/1984 Resch ................... B60T 8/4275
188/181 A
(Continued)

FOREIGN PATENT DOCUMENTS

DE   102010001542   8/2011
EP      2857268      4/2015
(Continued)

OTHER PUBLICATIONS

International Search Report for Application No. PCT/IB2016/056608 dated Jan. 27, 2017 (English Translation, 3 pages).

*Primary Examiner* — Christopher P Schwartz
(74) *Attorney, Agent, or Firm* — Michael Best & Friedrich LLP

(57) ABSTRACT

A brake fluid pressure control unit that can improve cost performance of a brake system is obtained. A brake system that includes such a brake fluid pressure control unit and a motorcycle are also obtained.
A brake fluid pressure control unit 50 includes: an inlet valve 21 provided in a primary channel 14; an outlet valve 22 provided in a secondary channel 15; a pressurizing/transferring mechanism 25 provided on a downstream side of the outlet valve 22 in the secondary channel 15 and pressurizing and transferring a brake fluid in the secondary channel 15; and a controller 51 for executing a fluid pressure control operation of the brake fluid in a wheel cylinder 13, and a power source of the pressurizing/transferring mechanism 25 is a drive mechanism 103 of the motorcycle 100, the drive
(Continued)

mechanism 103 being driven in a state where the fluid pressure control operation by the controller 51 is not executed.

9 Claims, 8 Drawing Sheets

(51) Int. Cl.
*B60T 8/40* (2006.01)
*B60T 8/36* (2006.01)
*B60T 8/42* (2006.01)

(58) Field of Classification Search
USPC .................................... 303/9.64, 113.4, 137
See application file for complete search history.

(56) References Cited

U.S. PATENT DOCUMENTS

| | | | | |
|---|---|---|---|---|
| 5,584,538 | A * | 12/1996 | Takasaki | B60R 25/08 188/353 |
| 6,315,370 | B1 * | 11/2001 | Feigel | B60T 7/042 303/113.4 |
| 7,549,710 | B2 * | 6/2009 | Takenouchi | B60T 8/3225 303/9.64 |
| 7,891,746 | B2 * | 2/2011 | Nakayama | B60T 8/1706 303/9.64 |
| 7,938,495 | B2 * | 5/2011 | Takenouchi | B60T 8/4081 303/137 |
| 2003/0015916 | A1 * | 1/2003 | Sakamoto | B60T 8/1706 303/137 |
| 2009/0243381 | A1 * | 10/2009 | Tahara | B60T 7/042 303/114.1 |
| 2011/0273005 | A1 * | 11/2011 | Westerfeld | B60T 8/1706 303/9.64 |
| 2012/0200148 | A1 * | 8/2012 | Waida | B60T 8/3225 303/191 |
| 2012/0205968 | A1 * | 8/2012 | Takenouchi | B60T 8/261 303/9.64 |
| 2017/0305432 | A1 * | 10/2017 | Nemoto | B60T 7/12 |

FOREIGN PATENT DOCUMENTS

| | | |
|---|---|---|
| GB | 2188995 | 10/1987 |
| JP | 5873461 | 5/1983 |
| JP | H0781545 A | 3/1995 |
| JP | 2002029403 A | 1/2002 |
| WO | 2010023985 | 3/2010 |

* cited by examiner

BRAKE FLUID PRESSURE CONTROL UNIT, BRAKE SYSTEM FOR MOTORCYCLE, AND MOTORCYCLE

BACKGROUND OF THE INVENTION

The invention relates to a brake fluid pressure control unit of a brake system for a motorcycle, a brake system for a motorcycle including the brake fluid pressure control unit, and a motorcycle including the brake system.

As a conventional motorcycle (a two-wheeled motor vehicle or a three-wheeled motor vehicle), a motorcycle that includes a brake system having a hydraulic circuit is available. The hydraulic circuit includes: a primary channel that communicates between a master cylinder and a wheel cylinder; and a secondary channel that releases a brake fluid in the primary channel. The primary channel is provided with an inlet valve, and the secondary channel is provided with an outlet valve. In addition, a pressurizing/transferring mechanism is provided on a downstream side of the outlet valve in the secondary channel. The pressurizing/transferring mechanism pressurizes and transfers the brake fluid in the secondary channel.

For example, a brake fluid pressure control unit is configured by including the inlet valve, the outlet valve, the pressurizing/transferring mechanism, a base body in which those components are embedded, and a controller. In the brake fluid pressure control unit, operations of the inlet valve and the outlet valve as well as an operation of the pressurizing/transferring mechanism are controlled, and a fluid pressure control operation of the brake fluid in the wheel cylinder is thereby executed.

SUMMARY OF THE INVENTION

In the above-described brake fluid pressure control unit, a motor as a power source of the pressurizing/transferring mechanism is exclusively used for execution of the fluid pressure control operation of the brake fluid in the wheel cylinder. Thus, the motor is added to the brake system for the execution of the fluid pressure control operation, which increases cost of the brake system. In other words, there is such a problem that cost performance of the brake system in the above-described fluid pressure control unit is degraded.

The invention has been made with the above-described problem as the background and therefore obtains a brake fluid pressure control unit that can improve cost performance of a brake system. The invention also obtains a brake system for a motorcycle that includes such a brake fluid pressure control unit. The invention further obtains a motorcycle that includes such a brake system.

A brake fluid pressure control unit according to the invention is a brake fluid pressure control unit of a brake system for a motorcycle. The brake system includes at least one hydraulic circuit having: a primary channel for communicating between a master cylinder and a wheel cylinder; and a secondary channel for releasing a brake fluid in the primary channel. The brake fluid pressure control unit includes: an inlet valve provided in the primary channel; an outlet valve provided in the secondary channel; a pressurizing/transferring mechanism provided on a downstream side of the outlet valve in the secondary channel and pressurizing and transferring the brake fluid in the secondary channel; and a controller for executing a fluid pressure control operation of the brake fluid in the wheel cylinder. A power source of the pressurizing/transferring mechanism is a drive mechanism of the motorcycle, the drive mechanism being driven in a state where the fluid pressure control operation by the controller is not executed.

A brake system for a motorcycle according to the invention includes the brake fluid pressure control unit as described above.

A motorcycle according to the invention includes the brake system as described above.

In the brake fluid pressure control unit according to the invention, the power source of the pressurizing/transferring mechanism is the drive mechanism of the motorcycle, the drive mechanism being driven in the state where the fluid pressure control operation of the brake fluid in the wheel cylinder by the controller is not executed. In other words, the drive mechanism of the motorcycle that is provided for a purpose other than the fluid pressure control operation of the brake fluid in the wheel cylinder is also used as the drive power of the pressurizing/transferring mechanism. Thus, a motor no longer has to be added to the brake system for execution of the fluid pressure control operation, and cost performance of the brake system is improved.

DETAILED DESCRIPTION

A description will hereinafter be made on a brake fluid pressure control unit, a brake system, and a motorcycle according to the invention by using the drawings.

Noted that each of a configuration, an operation, and the like, which will be described below, is merely one example, and the brake fluid pressure control unit, the brake system, and the motorcycle according to the invention are not limited to a case with such a configuration, such an operation, and the like. There is a case where the same or similar members or portions are denoted by the same reference sign in each of the drawings. In addition, a detailed structure is depicted in an appropriately simplified manner or is not depicted.

First Embodiment

A brake system according to a first embodiment will hereinafter be described.

<Configuration and Operation of the Brake System>

A description will be made on a configuration and an operation of the brake system according to the first embodiment.

Figure 1:
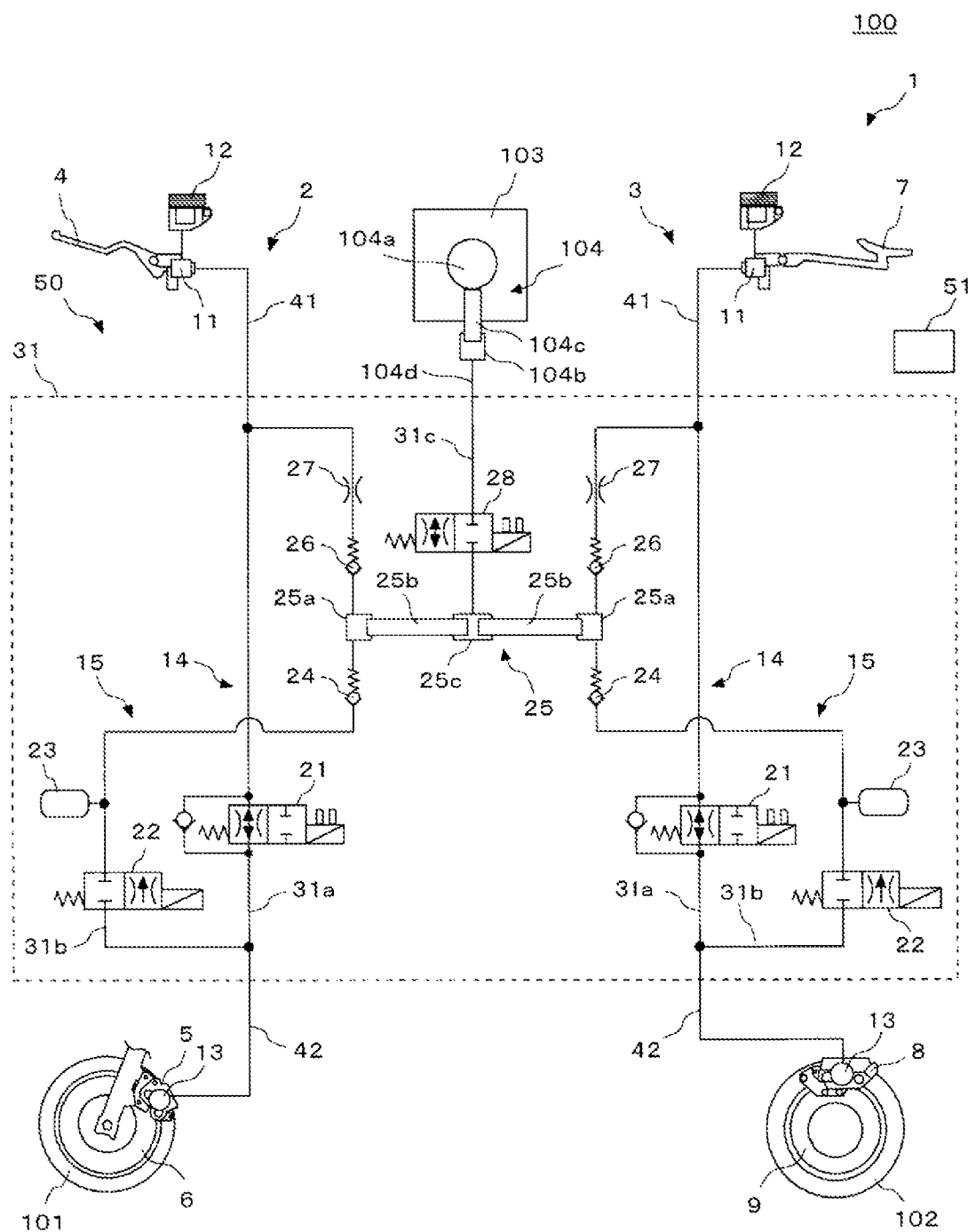
FIG. 1 is a view of a system configuration of a brake system according to a first embodiment of the invention.

FIG. 1 is a view of a system configuration of the brake system according to the first embodiment of the invention.

As depicted in FIG. 1, a brake system 1 is installed in a motorcycle 100 (a two-wheeled motor vehicle or a three-wheeled motor vehicle), and includes: a first hydraulic circuit 2 that acts on a front wheel 101 of the motorcycle 100; and a second hydraulic circuit 3 that acts on a rear wheel 102 of the motorcycle 100. A brake fluid is filled in the first hydraulic circuit 2 and the second hydraulic circuit 3.

A piston (not depicted), which reciprocates in an interlocking manner with a handlebar lever 4, is incorporated in a master cylinder 11 of the first hydraulic circuit 2. A reservoir 12 is attached to the master cylinder 11. A wheel cylinder 13 of the first hydraulic circuit 2 is provided in a front brake caliper 5. When fluid pressure of the brake fluid in the wheel cylinder 13 is increased, a brake pad (not depicted) of the front brake caliper 5 is pressed against a front rotor 6 that rotates together with the front wheel 101, and the front wheel 101 is thereby braked.

A piston (not depicted), which reciprocates in an interlocking manner with a foot pedal 7, is incorporated in a master cylinder 11 of the second hydraulic circuit 3. A reservoir 12 is attached to the master cylinder 11. A wheel cylinder 13 of the second hydraulic circuit 3 is provided in a rear brake caliper 8. When fluid pressure of the brake fluid in the wheel cylinder 13 is increased, a brake pad (not depicted) of the rear brake caliper 8 is pressed against a rear rotor 9 that rotates together with the rear wheel 102, and the rear wheel 102 is thereby braked.

Each of the first hydraulic circuit 2 and the second hydraulic circuit 3 includes: a primary channel 14 that communicates between the master cylinder 11 and the wheel cylinder 13; and a secondary channel 15 that releases the brake fluid in the primary channel 14. An inlet valve 21 is provided in an intermediate section of the primary channel 14. The secondary channel 15 communicates between the wheel cylinder 13 side and the master cylinder 11 side of the inlet valve 21 in the primary channel 14 via an outlet valve 22. The inlet valve 21 is an electromagnetic valve that is opened in an unenergized state and is closed in an energized state, for example. The outlet valve 22 is an electromagnetic valve that is closed in the unenergized state and is opened in the energized state, for example.

An accumulator 23, a check valve 24, a pressurizing/transferring mechanism 25, a check valve 26, and a restrictor 27 are sequentially provided on a downstream side of the outlet valve 22 in the secondary channel 15. The check valve 24 limits a flow of the brake fluid from the pressurizing/transferring mechanism 25 toward the accumulator 23. The pressurizing/transferring mechanism 25 includes: a cylinder 25a; a piston 25b, one end of which is inserted in the cylinder 25a; and a cylinder 25c in which the other end of the piston 25b is inserted. The other end of the piston 25b in the first hydraulic circuit 2 and the other end of the piston 25b in the second hydraulic circuit 3 may be inserted in the one cylinder 25c or may respectively be inserted in different cylinders 25c. The check valve 26 limits a flow of the brake fluid from the master cylinder 11 side of the inlet valve 21 in the primary channel 14 toward the pressurizing/transferring mechanism 25. The restrictor 27 restricts an abrupt pressure increase of the brake fluid in the master cylinder 11.

A power source of the pressurizing/transferring mechanism 25 is a drive mechanism 103 of the motorcycle 100, the drive mechanism 103 being driven in a state where a fluid pressure control operation of the brake fluid in the wheel cylinder 13 is not executed. In other words, the drive mechanism 103, which is provided in the motorcycle 100 for a purpose other than the fluid pressure control operation of the brake fluid in the wheel cylinder 13, is also used as the power source for a reciprocal operation of the piston 25b in the pressurizing/transferring mechanism 25. The drive mechanism 103 may constantly be driven in an operating state of the motorcycle 100 or may temporarily be driven at the beginning of an operation or in the operating state of the motorcycle 100.

Power of the drive mechanism 103 is transmitted to the pressurizing/transferring mechanism 25 via a transmission mechanism 104. The transmission mechanism 104, for example, includes: a cam 104a that is coupled to the drive mechanism 103; a cylinder 104b; a piston 104c, one end of which abuts against an outer circumferential surface of the cam 104a, and the other end of which is inserted in the cylinder 104b; and a transmission pipe 104d that communicates between the cylinder 104b and the cylinder 25c of the pressurizing/transferring mechanism 25. A transmission fluid (for example, a liquid) is filled in the cylinder 104b, the transmission pipe 104d, and the cylinder 25c.

The power that is transmitted by the transmission mechanism 104 is controlled by a transmitted power control mechanism 28. The transmitted power control mechanism 28 is an electromagnetic valve that is closed in an unenergized state and is opened in an energized state, for example. In other words, the transmitted power control mechanism 28 is a valve that controls distribution of the transmission fluid. The power that is transmitted by the transmission mechanism 104 may not be controlled by the transmitted power control mechanism 28 (that is, the transmitted power control mechanism 28 may not be provided), and the power of the drive mechanism 103 may constantly be transmitted to the pressurizing/transferring mechanism 25. Alternatively, the power that is transmitted by the transmission mechanism 104 may not be controlled by the transmitted power control mechanism 28 (that is, the transmitted power control mechanism 28 may not be provided), and an operating state of the drive mechanism 103 may be controlled.

In a state where the cylinder 104b communicates with the cylinder 25c of the pressurizing/transferring mechanism 25 and in a state where the drive mechanism 103 is driven, pressure of the transmission fluid in the cylinder 25c of the pressurizing/transferring mechanism 25 fluctuates in conjunction with rotation of the cam 104a. Then, the brake fluid is pressurized and transferred due to reciprocal motion of the piston 25b that is associated with fluctuations in the pressure of the transmission fluid. Noted that a transmission (gear) may be provided in a coupling section of the drive mechanism 103 and the cam 104a.

In each of the first hydraulic circuit 2 and the second hydraulic circuit 3, the inlet valve 21, the outlet valve 22, the accumulator 23, the check valve 24, the pressurizing/transferring mechanism 25, the check valve 26, and the restrictor 27 are provided in a base body 31 that is formed with a partial channel 31a for configuring a part of the primary channel 14 and a partial channel 31b for configuring the secondary channel 15. A brake fluid pipe 41 from the master cylinder 11 is connected to one end of the partial channel 31a in the base body 31, and a brake fluid pipe 42 from the wheel cylinder 13 is connected to the other end thereof. Both ends of the partial channel 31b in the base body 31 communicate with an intermediate section of the partial channel 31a.

The transmitted power control mechanism 28 is provided in the base body 31 and, for example, controls opening/closing, an opening amount, and the like of a transmission channel 31c that is formed in the base body 31. One end of the transmission channel 31c is connected to the transmission pipe 104d, and the other end thereof communicates with the cylinder 25c of the pressurizing/transferring mechanism 25. The transmitted power control mechanism 28 may be provided in a member other than the base body 31.

A brake fluid pressure control unit 50 is configured by at least including the base body 31, each member that is used to control fluid pressure of the wheel cylinder 13, and a controller 51 (an ECU). In the brake fluid pressure control unit 50, the operations of the inlet valve 21 and the outlet valve 22 are at least controlled by the controller 51. In this way, the fluid pressure of the brake fluid in the wheel cylinder 13 is controlled.

The controller 51 may be provided as one unit or may be divided into plural units. For example, the controller 51 may be divided into a portion that controls the fluid pressure of the brake fluid in the first hydraulic circuit 2 and a portion that controls the fluid pressure of the brake fluid in the second hydraulic circuit 3. In addition, the controller 51 may be attached to the base body 31 or may be attached to another member. A part or a whole of the controller 51 may be constructed of a microcomputer, a microprocessor, or the like, for example, may be constructed of a member in which firmware can be updated, or may be a program module or the like that is executed by a command from a CPU or the like.

The controller 51 executes the following fluid pressure control operation, for example.

In the case where locking or possible locking of a wheel (the front wheel 101, the rear wheel 102) of the motorcycle 100 is detected by a detection signal of a wheel rotation sensor (not depicted), for example, when the handlebar lever 4 or the foot pedal 7 of the motorcycle 100 is operated, the controller 51 initiates anti-lock brake control of the wheel.

Once the anti-lock brake control is initiated, the controller 51 brings the inlet valve 21 into the energized state and blocks the primary channel 14, so as to limit the flow of the brake fluid from the master cylinder 11 to the wheel cylinder 13. In addition, the controller 51 brings the outlet valve 22 into the energized state and opens the secondary channel 15, so as to allow the flow of the brake fluid from the wheel cylinder 13 to the accumulator 23. Furthermore, when the transmitted power control mechanism 28 limits the power transmitted by the transmission mechanism 104, the controller 51 cancels the limitation. Then, when the drive mechanism 103 is not in a driven state, the controller 51 drives the drive mechanism 103 and thereby allows recirculation of the brake fluid, which is accumulated in the accumulator 23, into the primary channel 14.

When cancellation of locking or avoidance of locking of the wheel (the front wheel 101, the rear wheel 102) of the motorcycle 100 is detected, the controller 51 brings the inlet valve 21 and the outlet valve 22 into the unenergized states. Then, when the limitation on the power transmitted by the transmission mechanism 104 was canceled for the anti-lock brake control, the controller 51 makes the transmitted power control mechanism 28 limit the power. Furthermore, when the drive mechanism 103 is driven for the anti-lock brake control, the controller 51 stops driving of the drive mechanism 103 and thereby terminates the anti-lock brake control.

Noted that the transmission mechanism 104 transmits the power of the drive mechanism 103 by using the pressure of the transmission fluid in FIG. 1; however, the power of the drive mechanism 103 may be transmitted by another method. For example, the end of the piston 25b in the pressurizing/transferring mechanism 25 on the side that is not inserted in the cylinder 25a may abut against a cam, the piston 25b may reciprocate by the cam, and a pulley that is coupled to the drive mechanism 103 and the cam may be coupled via a belt. Alternatively, the drive mechanism 103 and the cam may directly be coupled without interposing the transmission mechanism 104 therebetween.

<Installation Example of the Brake Fluid Pressure Control Unit in the Motorcycle>

A description will be made on an installation example of the brake fluid pressure control unit of the brake system according to the first embodiment in the motorcycle.

Figure 2:
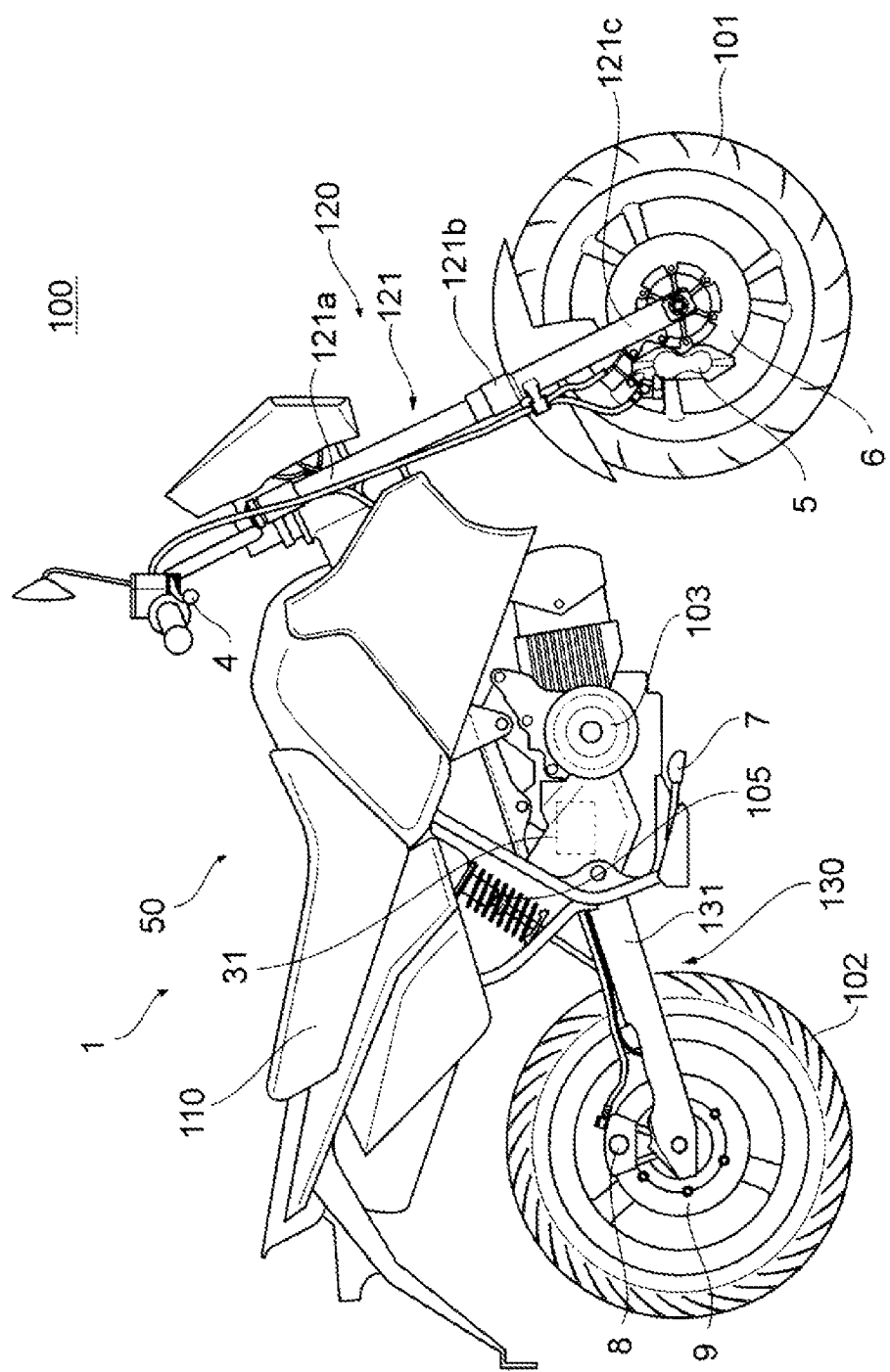
FIG. 2 is a view of an installation example of a brake fluid pressure control unit of the brake system according to the first embodiment of the invention in a motorcycle.

FIG. 2 is a view of the installation example of the brake fluid pressure control unit of the brake system according to the first embodiment of the invention in the motorcycle.

As depicted in FIG. 2, the motorcycle 100 includes: a trunk section 110; a turning section 120 that is turnably held by the trunk section 110 and holds the front wheel 101; and a coupling section 130 that couples the trunk section 110 and the rear wheel 102.

The turning section 120 includes a front fork 121 that is axially supported by the trunk section 110. The front fork 121 includes: a front fork upper end 121a, a front suspension 121b, and a front fork lower end 121c. The front fork upper end 121a and the front fork lower end 121c are coupled via the front suspension 121b. In this way, the front fork 121 can be contracted/extended along an axis thereof. The front wheel 101 is axially supported by the front fork lower end 121c in a rotatable manner. In addition, the front brake caliper 5 is attached to the front fork lower end 121c. The brake pad (not depicted) of the front brake caliper 5 applies a friction force to the front rotor 6 that rotates together with the front wheel 101.

The coupling section 130 includes a swing arm 131 that is axially supported by the trunk section 110 in a swingable manner. The other end of a rear suspension 105, one end of which is coupled to the trunk section 110, is coupled to an intermediate section of the swing arm 131. In addition, the rear brake caliper 8 is attached to a rear end of the swing arm 131. The brake pad (not depicted) of the rear brake caliper 8 applies the friction force to the rear rotor 9 that rotates together with the rear wheel 102.

In other words, the turning section 120 is defined as a portion of the motorcycle 100 that turns with the front wheel 101, and includes the front fork 121. Meanwhile, the coupling section 130 is defined as a portion of the motorcycle 100 that couples the trunk section 110 and the rear wheel 102, and includes the swing arm 131. In addition, with the front suspension 121b being a reference, a portion on the trunk section 110 side of the turning section 120 is defined as a portion above a spring, and a portion on the front wheel 101 side thereof is defined as a portion below the spring. With a position at which the other end (that is, an end on a side that is not coupled to the trunk section 110) of the rear suspension 105 is coupled being a reference, a portion on the trunk section 110 side of the coupling section 130 is defined as a portion above a spring, and a portion on the rear wheel 102 side thereof is defined as a portion below the spring.

For example, as depicted in FIG. 2, the base body 31 is attached to a member that configures a part of the trunk section 110, and the drive mechanism 103 that serves as the power source of the pressurizing/transferring mechanism 25 is an engine of the motorcycle 100. As the drive mechanism 103 that serves as the power source of the pressurizing/transferring mechanism 25, the wheels (the front wheel 101, the rear wheel 102), a power source of suspensions (the front suspension 121b, the rear suspension 105), a starter motor, or the like of the motorcycle 100 may be used. In addition, the base body 31 may be disposed in a member other than the trunk section 110.

<Effects of the Brake System>

A description will be made on effects of the brake system according to the first embodiment.

In the brake fluid pressure control unit 50 of the brake system 1, the power source of the pressurizing/transferring mechanism 25 is the drive mechanism 103 of the motorcycle 100, the drive mechanism 103 being driven in the state where the fluid pressure control operation is not executed by the controller 51. In other words, the drive mechanism 103, which is provided in the motorcycle 100 for the purpose other than the fluid pressure control operation by the controller 51, is also used as the power source of the pressurizing/transferring mechanism 25. Thus, the motor no longer needs to be added to the brake system 1 for the execution of the fluid pressure control operation, and cost performance of the brake system 1 is improved.

Preferably, in the brake fluid pressure control unit 50 of the brake system 1, the power of the drive mechanism 103 is transmitted to the pressurizing/transferring mechanism 25 via the transmission mechanism 104, and the transmitted power control mechanism 28 that controls the power transmitted by the transmission mechanism 104 is provided. With such a configuration, in the case where the drive mechanism 103 is driven regardless of an execution state of the fluid pressure control operation of the brake fluid in the wheel cylinder 13 (for example, is constantly driven in the operating state of the motorcycle 100, or the like), the pressurizing/transferring mechanism 25 can be driven only when needed. Thus, durability and the like of the pressurizing/transferring mechanism 25 are improved.

Preferably, in the brake fluid pressure control unit 50 of the brake system 1, the transmission mechanism 104 includes the transmission pipe 104*d* that is filled with the transmission fluid, and the transmitted power control mechanism 28 is the valve that controls the distribution of the transmission fluid. With such a configuration, compared to a case where the transmission mechanism 104 transmits the power of the drive mechanism 103 via the belt and the like, necessity of disposing the base body 31 near the drive mechanism 103 is reduced. Thus, a degree of freedom in selection of the drive mechanism 103 is improved.

Second Embodiment

A description will be made on a brake system according to a second embodiment.

Noted that the overlapping or similar description to that on the brake system according to the first embodiment will appropriately be simplified or omitted.

<Configuration and Operation of the Brake System>

A description will be made on a configuration and an operation of the brake system according to the second embodiment.

Figure 3:
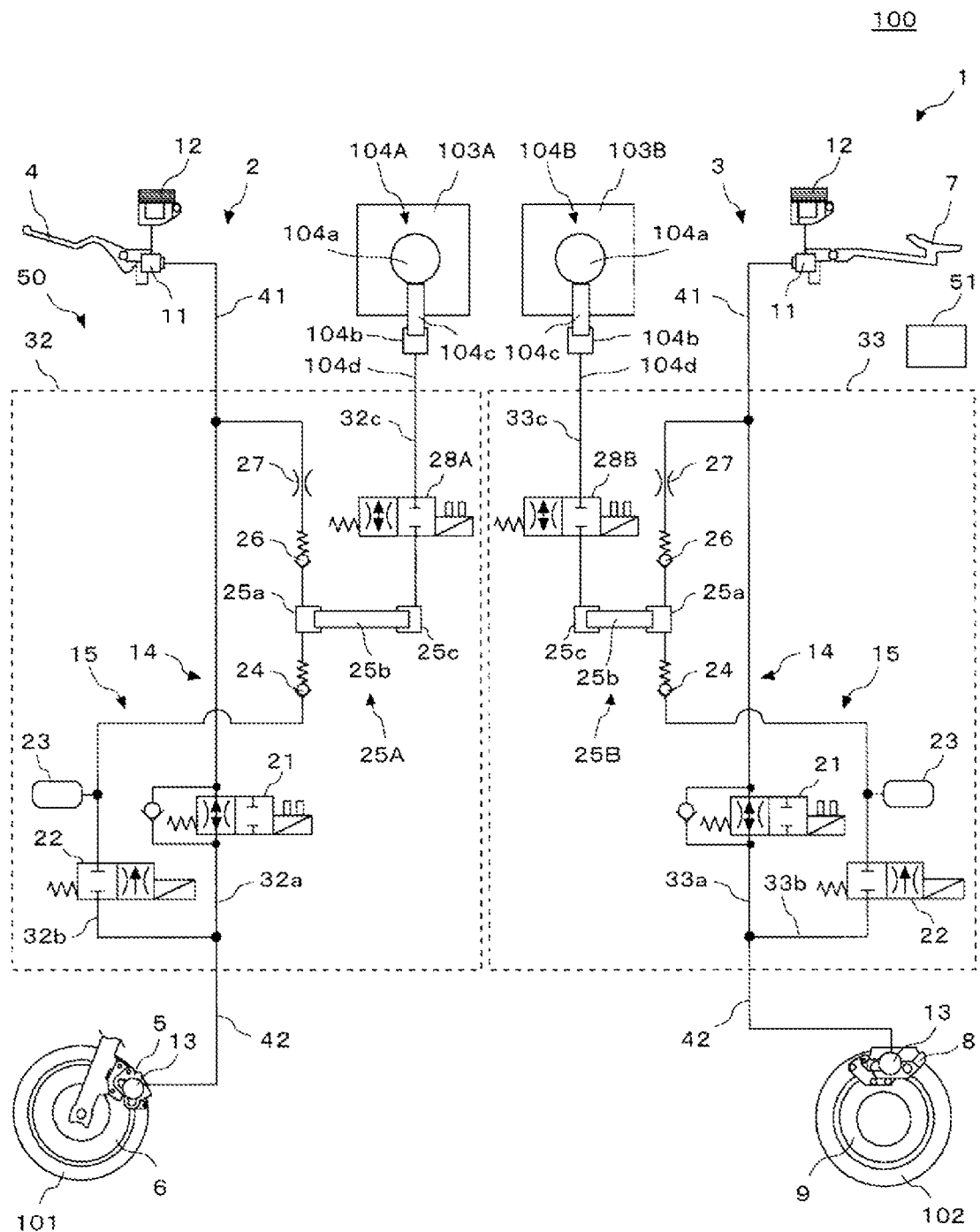
FIG. 3 is a view of a system configuration of a brake system according to a second embodiment of the invention.

FIG. 3 is a view of a system configuration of the brake system according to the second embodiment of the invention.

As depicted in FIG. 3, the inlet valve 21, the outlet valve 22, the accumulator 23, the check valve 24, a pressurizing/transferring mechanism 25A, the check valve 26, and the restrictor 27 in the first hydraulic circuit 2 are provided in a base body 32 that is formed with: a partial channel 32*a* for configuring a part of the primary channel 14; and a partial channel 32*b* for configuring the secondary channel 15. In addition, the inlet valve 21, the outlet valve 22, the accumulator 23, the check valve 24, a pressurizing/transferring mechanism 25B, the check valve 26, and the restrictor 27 in the second hydraulic circuit 3 are provided in a base body 33 that is formed with: a partial channel 33*a* for configuring a part of the primary channel 14; and a partial channel 33*b* for configuring the secondary channel 15. In other words, the members for configuring the first hydraulic circuit 2 and the members for configuring the second hydraulic circuit 3 are provided in a manner to be respectively divided into the base body 32 and the base body 33.

The cylinder 25*c* of the pressurizing/transferring mechanism 25A communicates with the cylinder 104*b* of a transmission mechanism 104A, which transmits power of a drive mechanism 103A, via the transmission pipe 104*d*. The cylinder 25*c* of the pressurizing/transferring mechanism 25B communicates with the cylinder 104*b* of a transmission mechanism 104B, which transmits power of a drive mechanism 103B, via the transmission pipe 104*d*. In other words, the pressurizing/transferring mechanism 25A and the pressurizing/transferring mechanism 25B respectively use the drive mechanisms 103A, 103B as the power sources. Noted that the pressurizing/transferring mechanism 25A of the first hydraulic circuit 2 and the pressurizing/transferring mechanism 25B of the second hydraulic circuit 3 may use the same drive mechanism as the power source.

<Installation Example of the Brake Fluid Pressure Control Unit in the Motorcycle>

A description will be made on an installation example of a brake fluid pressure control unit of the brake system according to the second embodiment in the motorcycle.

Figure 4:
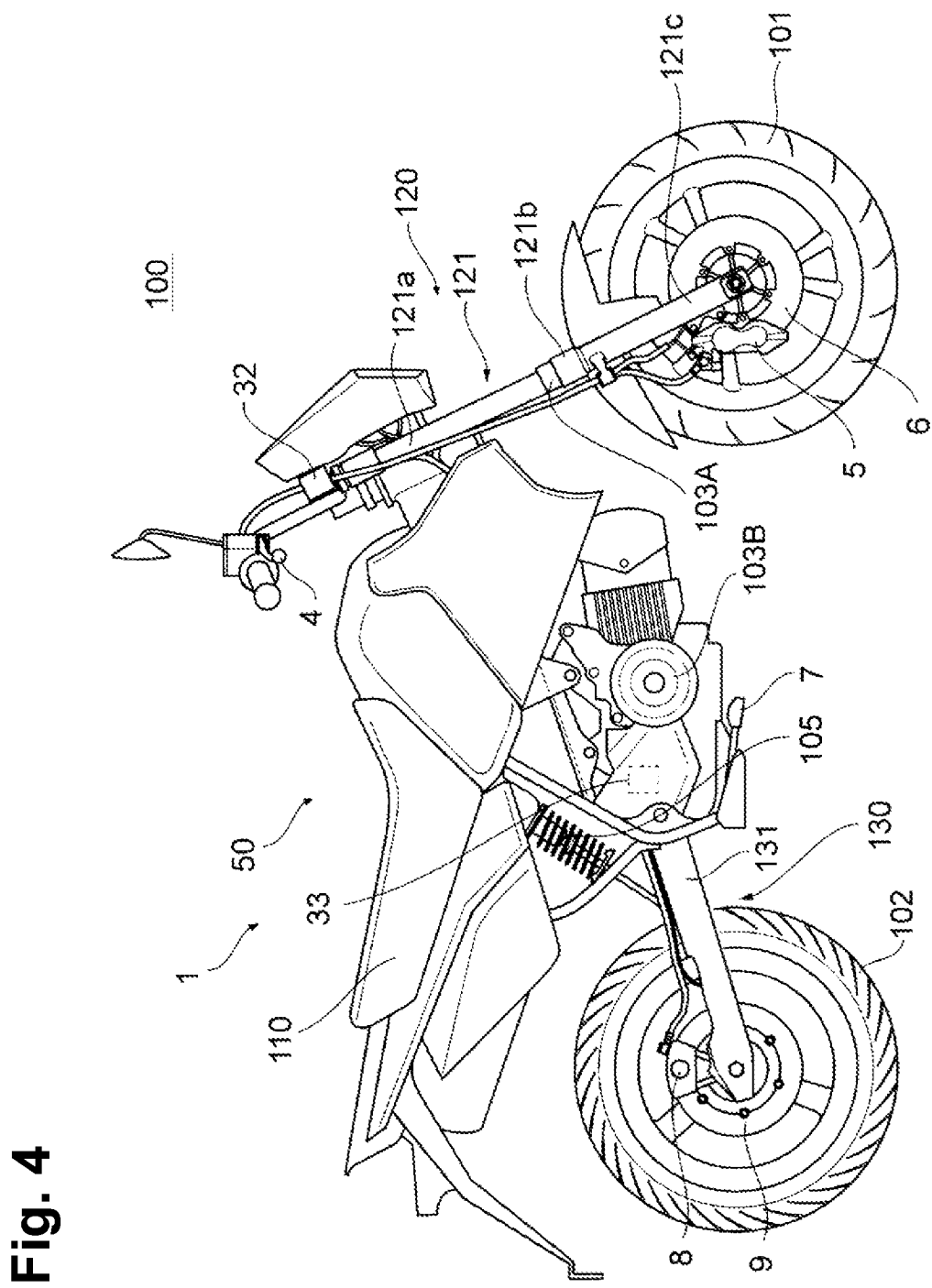
FIG. 4 is a view of an installation example of a brake fluid pressure control unit of the brake system according to the second embodiment of the invention in the motorcycle.

FIG. 4 is a view of the installation example of the brake fluid pressure control unit of the brake system according to the second embodiment of the invention in the motorcycle.

For example, as depicted in FIG. 4, the base body 32 is attached to a member that configures a part of the turning section 120 (for example, a periphery of the handlebar lever 4, the front fork 121, or the like). Meanwhile, the base body 33 is attached to a member that configures a lower portion of the trunk section 110 (for example, a periphery of the foot pedal 7, a region between the engine and the swing arm 131, or the like) or a member that configures a part of the coupling section 130 (for example, the swing arm 131 or the like). In other words, compared to the base body 33, the base body 32 is disposed in a front side of the motorcycle 100. In addition, the base body 32 is disposed in the turning section 120 of the motorcycle 100. Furthermore, the base body 33 is disposed in the lower portion of the trunk section 110 or the coupling section 130.

For example, the drive mechanism 103A that serves as the drive source of the pressurizing/transferring mechanism 25A in the first hydraulic circuit 2 is a drive mechanism that configures a part of the turning section 120 (for example, the power source of the front suspension 121*b*, the front wheel 101, and the like). Meanwhile, the drive mechanism 103B that serves as the drive source of the pressurizing/transferring mechanism 25B in the second hydraulic circuit 3 is a drive mechanism that configures the lower portion of the trunk section 110 (for example, the engine) or the rear wheel 102. In other words, compared to the drive mechanism 103B that serves as the power source of the pressurizing/transferring mechanism 25B in the second hydraulic circuit 3, the drive mechanism 103A that serves as the power source of the pressurizing/transferring mechanism 25A in the first hydraulic circuit 2 is disposed in the front side of the motorcycle 100.

<Effects of the Brake System>

A description will be made on effects of the brake system according to the second embodiment.

Preferably, in the brake fluid pressure control unit 50 of the brake system 1, the members for configuring the first hydraulic circuit 2 and the members for configuring the second hydraulic circuit 3 are provided in the manner to be respectively divided into the base body 32 and the base body 33. In other words, the base body 32, which is provided with the members for configuring the first hydraulic circuit 2, and the base body 33, which is provided with the members for configuring the second hydraulic circuit 3, separate from each other and are downsized. Thus, degrees of freedom in disposed positions of the base bodies 32, 33 are improved, and the degree of freedom in the selection of the drive mechanism 103 is improved.

In conjunction with the above, compared to the base body 33, the base body 32 can be disposed in the front side of the motorcycle 100. With such a configuration, length of the brake fluid pipes 41, 42 in the first hydraulic circuit 2 can be reduced, and length of the brake fluid pipes 41, 42 in the second hydraulic circuit 3 can be reduced. Thus, in a body side of the motorcycle 100, spaces that need to be secured for piping are reduced.

In addition, in conjunction with the above, the base body 32 can be disposed in the turning section 120 of the motorcycle 100. With such a configuration, the brake fluid pipes 41, 42 of the first hydraulic circuit 2 can be arranged to be the shortest. Thus, in the body side of the motorcycle 100, the spaces that need to be secured for piping are further reduced.

Furthermore, in conjunction with the above, the base body 33 can be disposed in the lower portion of the trunk section 110 of the motorcycle 100. With such a configuration, the brake fluid pipes 41, 42 of the second hydraulic circuit 3 can be disposed to be the shortest. Thus, in the body side of the motorcycle 100, the spaces that need to be secured for piping are even further reduced.

Moreover, in conjunction with the above, the drive mechanism 103A, which is disposed in the front side of the motorcycle 100, can be selected as the power source of the pressurizing/transferring mechanism 25A in the first hydraulic circuit 2, and the drive mechanism 103B, which is disposed in a rear side of the motorcycle 100, can be selected as the power source of the pressurizing/transferring mechanism 25B in the second hydraulic circuit 3. With such a configuration, length and the like of the transmission pipe 104d can be reduced. Thus, a space that needs to be secured in the body side of the motorcycle 100 is reduced.

Third Embodiment

A description will be made on a brake system according to a third embodiment.

Noted that the overlapping or similar description to those on the brake systems according to the first embodiment and the second embodiment will appropriately be simplified or omitted.

<Configuration and Operation of the Brake System>

A description will be made on a configuration and an operation of the brake system according to the third embodiment.

Figure 5:
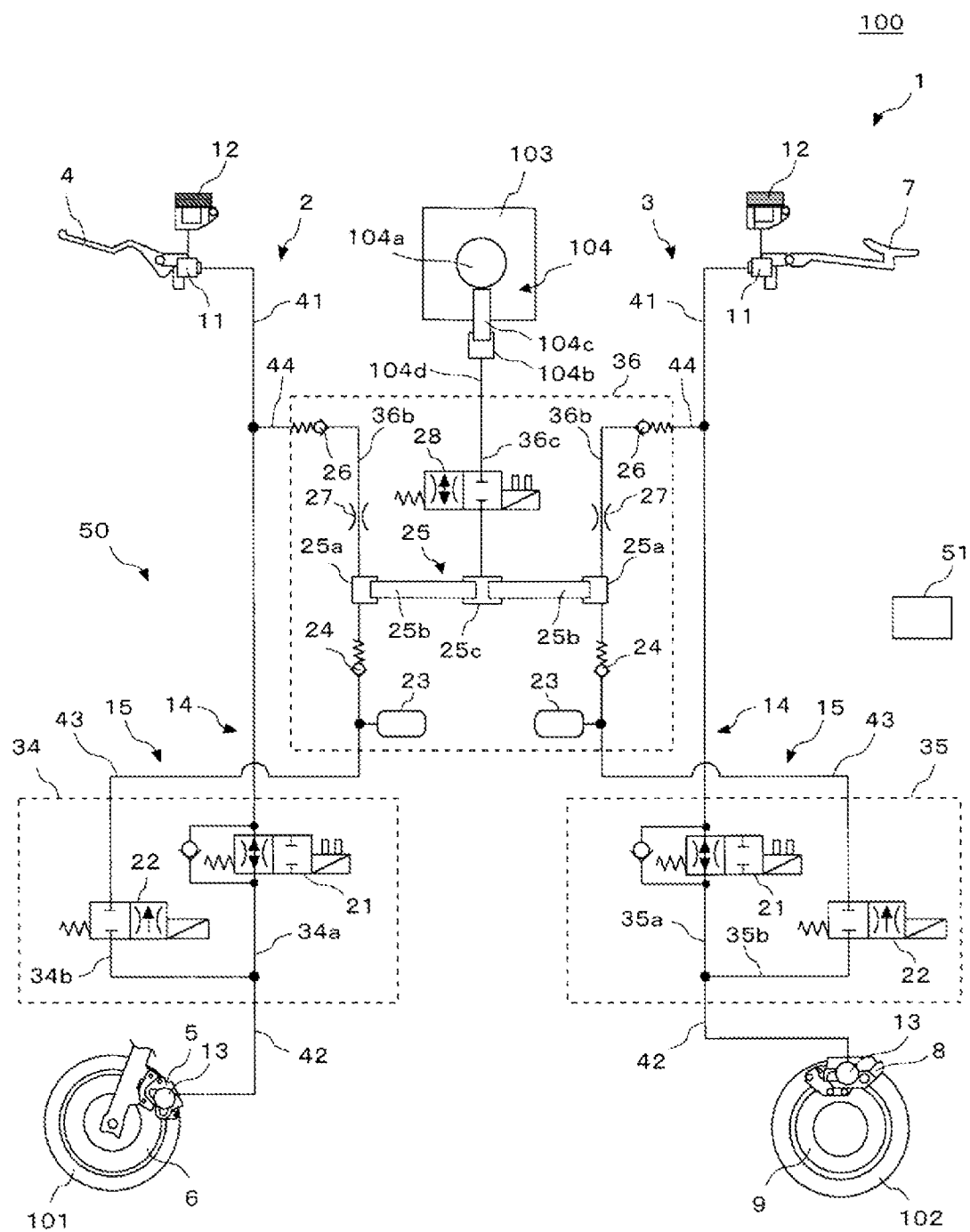
FIG. 5 is a view of a system configuration of a brake system according to a third embodiment of the invention.

FIG. 5 is a view of a system configuration of the brake system according to the third embodiment of the invention.

As depicted in FIG. 5, the inlet valve 21 and the outlet valve 22 of the first hydraulic circuit 2 are provided in a base body 34 that is formed of: a partial channel 34a for configuring a part of the primary channel 14; and a partial channel 34b for configuring a part of the secondary channel 15.

Meanwhile, the inlet valve 21 and the outlet valve 22 of the second hydraulic circuit 3 are provided in a base body 35 that is formed of: a partial channel 35a for configuring a part of the primary channel 14; and a partial channel 35b for configuring a part of the secondary channel 15. In addition, the accumulator 23, the check valve 24, the pressurizing/transferring mechanism 25, the check valve 26, and the restrictor 27 in each of the first hydraulic circuit 2 and the second hydraulic circuit 3 are provided in a base body 36 that is formed with a partial channel 36b for configuring a part of the secondary channel 15. In other words, the inlet valve 21 and the outlet valve 22 of the first hydraulic circuit 2, the inlet valve 21 and the outlet valve 22 of the second hydraulic circuit 3, and the pressurizing/transferring mechanism 25 are provided in a manner to be respectively divided into the base body 34, the base body 35, and the base body 36.

The brake fluid pipe 41 from the master cylinder 11 is connected to one end of each of the partial channels 34a, 35a of the base bodies 34, 35, and the brake fluid pipe 42 from the wheel cylinder 13 is connected to the other end thereof. One ends of the partial channels 34b, 35b of the base bodies 34, 35 respectively communicate with intermediate sections of the partial channels 34a, 35a, and upstream ends of brake fluid pipes 43 are respectively connected to the other ends thereof. A downstream end of the brake fluid pipe 43 is connected to an end of the partial channel 36b in the base body 36, and a brake fluid pipe 44, which communicates with an intermediate section of the brake fluid pipe 41, is connected to the other end thereof.

The cylinder 25c of the pressurizing/transferring mechanism 25 communicates with the cylinder 104b via the transmission pipe 104d. The other end of the piston 25b in the first hydraulic circuit 2 and the other end of the piston 25b in the second hydraulic circuit 3 may be inserted in the one cylinder 25c or may be inserted in different cylinders 25c.

<Installation Example of the Brake Fluid Pressure Control Unit in the Motorcycle>

A description will be made on an installation example of a brake fluid pressure control unit of the brake system according to the third embodiment in the motorcycle.

Figure 6:
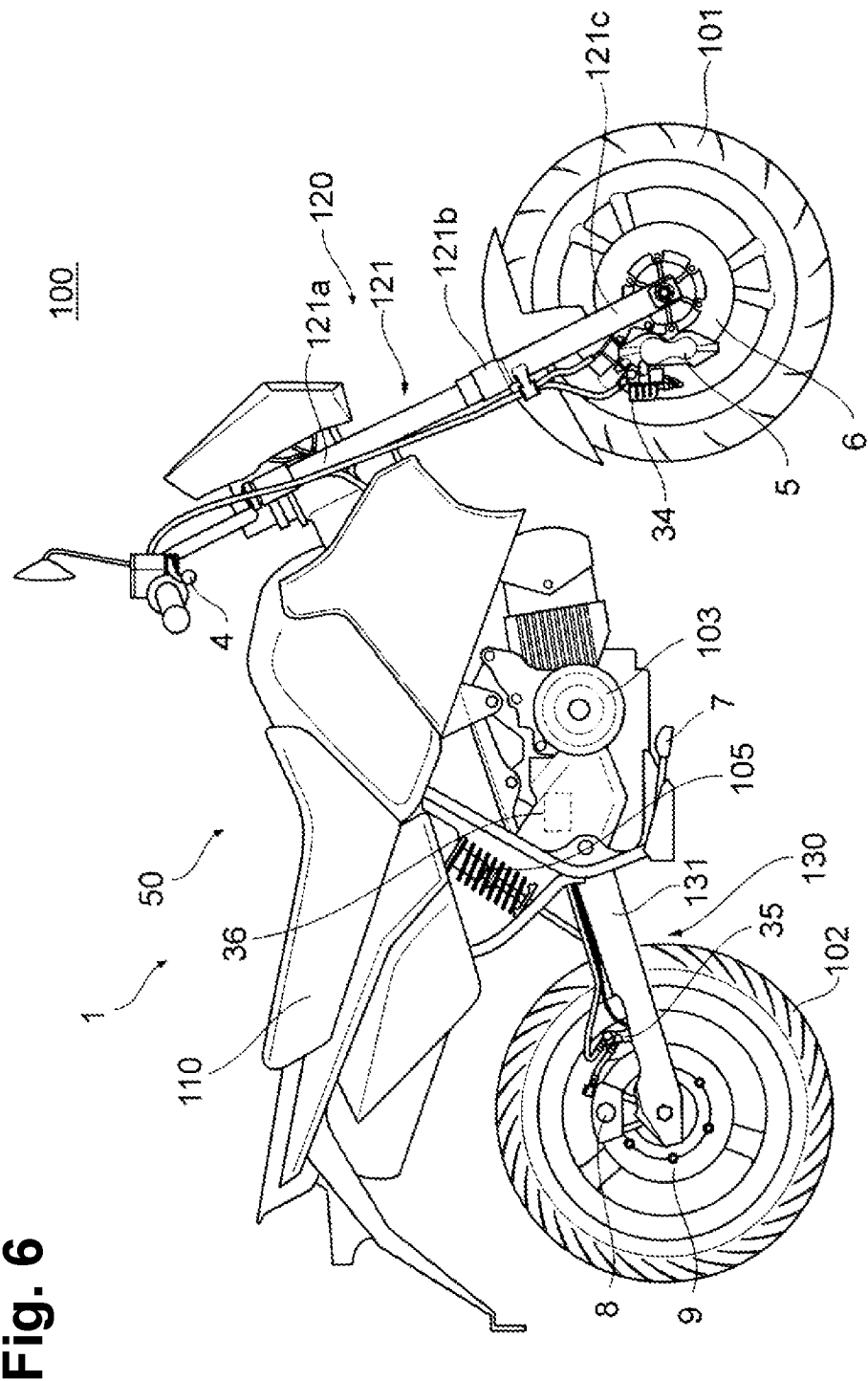
FIG. 6 is a view of an installation example of a brake fluid pressure control unit of the brake system according to the third embodiment of the invention in the motorcycle.

FIG. 6 is a view of the installation example of the brake fluid pressure control unit of the brake system according to the third embodiment of the invention in the motorcycle.

For example, as depicted in FIG. 6, the base body 34 is attached to the front brake caliper 5, and the base body 35 is attached to the rear brake caliper 8. In addition, the base body 36 is attached to a member that configures a part of the trunk section 110. In other words, the base body 34 and the base body 35 are disposed under the springs of the motorcycle 100.

<Effects of the Brake System>

A description will be made on effects of the brake system according to the third embodiment.

Preferably, in the brake fluid pressure control unit 50 of the brake system 1, combinations of the inlet valves 21 and the outlet valves 22 and the pressurizing/transferring mechanism 25 are provided in the manner to be respectively divided into the base bodies 34, 35 and the base body 36. In other words, the base bodies 34, 35, each of which is provided with the inlet valve 21 and the outlet valve 22, and the base body 36, which is provided with the pressurizing/transferring mechanism 25, separate from each other and are downsized. Thus, a degree of freedom in a disposed position of the base body 36 is improved, and the degree of freedom in the selection of the drive mechanism 103 is improved.

In conjunction with the above, the base bodies 34, 35, each of which is provided with the inlet valve 21 and the outlet valve 22, can be disposed under the springs of the motorcycle 100. With such a configuration, spaces that need to be secured for the base bodies in the trunk section 110 of the motorcycle 100 are reduced.

Fourth Embodiment

A description will be made on a brake system according to a fourth embodiment.

Noted that the overlapping or similar description to those on the brake systems according to the first embodiment to the third embodiment will appropriately be simplified or omitted.

<Configuration and Operation of the Brake System>

A description will be made on a configuration and an operation of the brake system according to the fourth embodiment.

Figure 7:
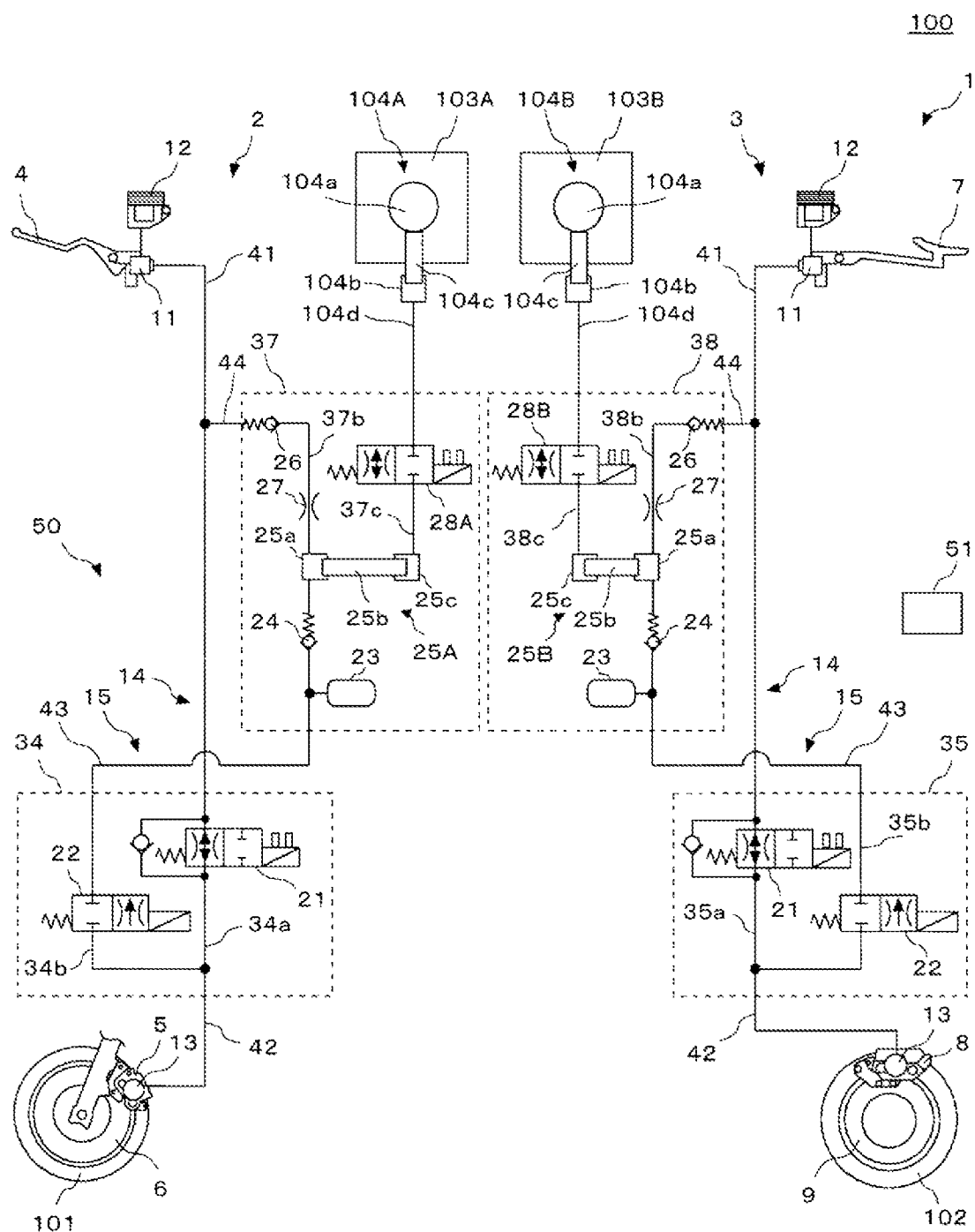
FIG. 7 is a view of a system configuration of a brake system according to a fourth embodiment of the invention.

FIG. 7 is a view of a system configuration of the brake system according to the fourth embodiment of the invention.

As depicted in FIG. 7, the accumulator 23, the check valve 24, the pressurizing/transferring mechanism 25A, the check valve 26, and the restrictor 27 in the first hydraulic circuit 2 are provided in a base body 37 that is formed with a partial channel 37b for configuring a part of the secondary channel 15. Meanwhile, the accumulator 23, the check valve 24, the pressurizing/transferring mechanism 25B, the check valve 26, and the restrictor 27 in the second hydraulic circuit 3 are provided in a base body 38 that is formed with a partial channel 38b for configuring a part of the secondary channel 15. In other words, the members for configuring the first hydraulic circuit 2 and the members for configuring the second hydraulic circuit 3 are provided in the manner to be respectively divided into the base bodies 34, 37 and the base bodies 35, 38. In addition, the combinations of the inlet valve 21 and the outlet valve 22 and the pressurizing/transferring mechanisms 25A, 25B are provided in the manner to be respectively divided into the base bodies 34, 37 and the base bodies 35, 38.

The cylinder 25c of the pressurizing/transferring mechanism 25A communicates with the cylinder 104b of the transmission mechanism 104A that transmits power of the drive mechanism 103A, via the transmission pipe 104d. The cylinder 25c of the pressurizing/transferring mechanism 25B communicates with the cylinder 104b of the transmission mechanism 104B that transmits power of the drive mechanism 103B, via the transmission pipe 104d. In other words, the pressurizing/transferring mechanism 25A and the pressurizing/transferring mechanism 25B respectively use the drive mechanisms 103A, 103B as the power sources. Noted that the pressurizing/transferring mechanism 25A of the first hydraulic circuit 2 and the pressurizing/transferring mechanism 25B of the second hydraulic circuit 3 may use the same drive mechanism as the power source.

<Installation Example of the Brake Fluid Pressure Control Unit in the Motorcycle>

A description will be made on an installation example of a brake fluid pressure control unit of the brake system according to the fourth embodiment in the motorcycle.

Figure 8:
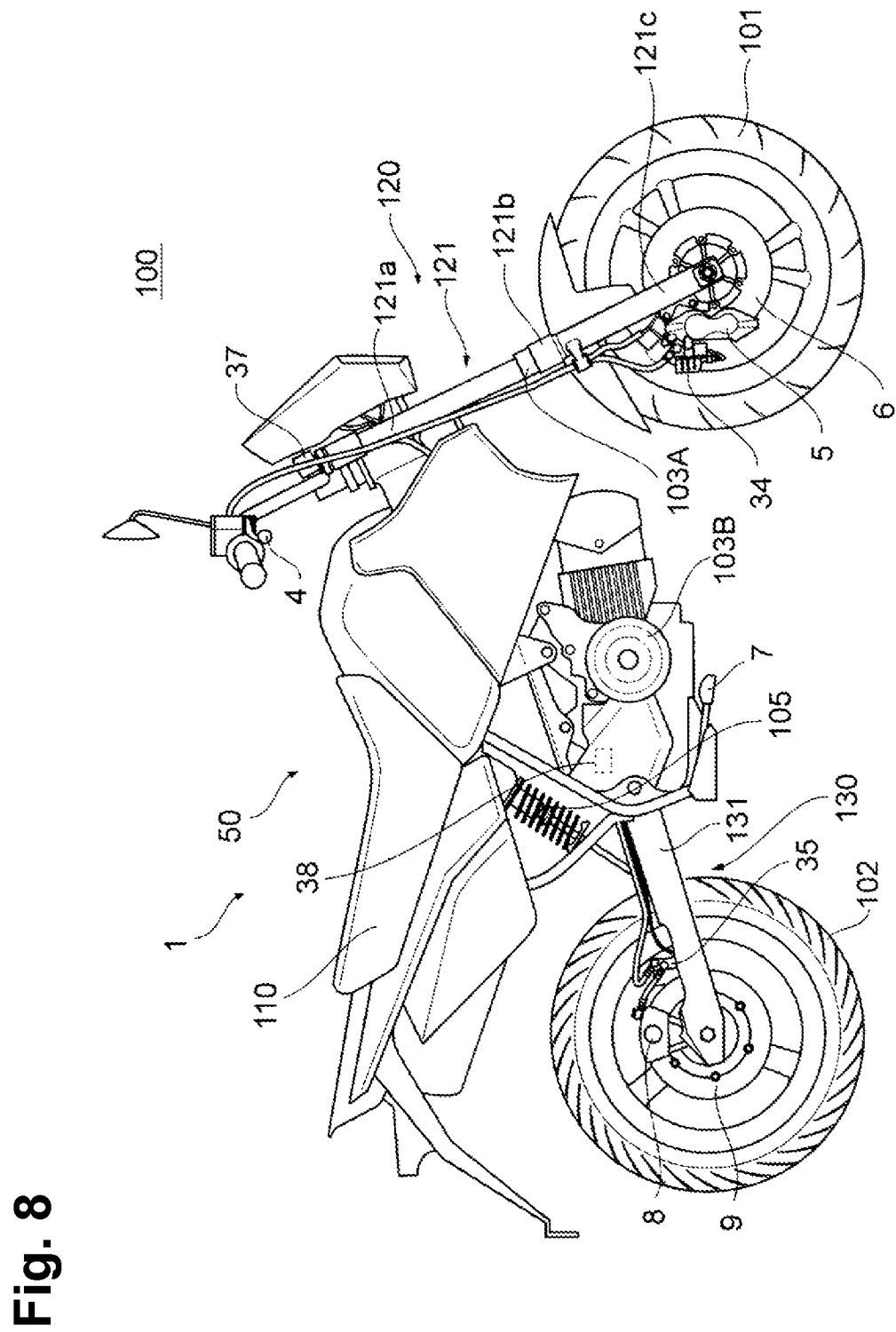
FIG. 8 is a view of an installation example of a brake fluid pressure control unit of the brake system according to the fourth embodiment of the invention in the motorcycle.

FIG. 8 is a view of the installation example of the brake fluid pressure control unit of the brake system according to the fourth embodiment of the invention in the motorcycle.

For example, as depicted in FIG. 8, the base body 34 is attached to the front brake caliper 5, and the base body 35 is attached to the rear brake caliper 8. Meanwhile, the base body 37 is attached to the member that configures the part of the turning section 120 (for example, the periphery of the handlebar lever 4, the front fork 121, or the like). In addition, the base body 38 is attached to the member that configures the lower portion of the trunk section 110 (for example, the periphery of the foot pedal 7, the region between the engine and the swing arm 131, or the like). In other words, the base body 34 and the base body 35 are disposed under the springs of the motorcycle 100. In addition, the base bodies 34, 37, which are provided with the members for configuring the first hydraulic circuit 2, are disposed in the turning section 120 of the motorcycle 100. Meanwhile, the base bodies 35, 38, which are provided with the members for configuring the second hydraulic circuit 3, are disposed in the coupling section 130 of the motorcycle 100 or in the lower portion of the trunk section 110 of the motorcycle 100.

For example, the drive mechanism 103A that serves as the drive source of the pressurizing/transferring mechanism 25A in the first hydraulic circuit 2 is a drive mechanism that configures a part of the turning section 120 (for example, the power source of the front suspension 121b, the front wheel 101, or the like). Meanwhile, the drive mechanism 103B that serves as the drive source of the pressurizing/transferring mechanism 25B in the second hydraulic circuit 3 is a drive mechanism that configures the lower portion of the trunk section 110 (for example, the engine) or the rear wheel 102. In other words, compared to the drive mechanism 103B that serves as the power source of the pressurizing/transferring mechanism 25B in the second hydraulic circuit 3, the drive mechanism 103A that serves as the power source of the pressurizing/transferring mechanism 25A in the first hydraulic circuit 2 is disposed in the front side of the motorcycle 100.

<Effects of the Brake System>

A description will be made on effects of the brake system according to the fourth embodiment.

Preferably, in the brake fluid pressure control unit 50 of the brake system 1, the members for configuring the first hydraulic circuit 2 and the members for configuring the second hydraulic circuit 3 are provided in the manner to be respectively divided into the base bodies 34, 37 and the base bodies 35, 38. In addition, the combinations of the inlet valves 21 and the outlet valves 22 and the pressurizing/transferring mechanisms 25A, 25B are provided in the manner to be respectively divided into the base bodies 34, 35 and the base bodies 37, 38. In other words, the base body 34, which is provided with the inlet valve 21 and the outlet valve 22 of the first hydraulic circuit 2, the base body 35, which is provided with the inlet valve 21 and the outlet valve 22 of the second hydraulic circuit 3, the base body 37, which is provided with the pressurizing/transferring mechanism 25A, and the base body 38, which is provided with the pressurizing/transferring mechanism 25B, separate from each other and are downsized. Thus, degrees of freedom in disposed positions of the base bodies 37, 38 are improved, and the degree of freedom in the selection of the drive mechanism 103 is improved.

In conjunction with the above, the base body 37 and the base body 38 can be disposed at different positions in the trunk section 110 of the motorcycle 100. In addition, the base bodies 34, 35, each of which is provided with the inlet valve 21 and the outlet valve 22, can be disposed under the springs of the motorcycle 100. With such a configuration, the spaces that need to be secured for piping in the motorcycle 100 are reduced, and the spaces that need to be secured for the base bodies in the trunk section 110 of the motorcycle 100 are reduced.

In addition, in conjunction with the above, the drive mechanism 103A, which is disposed in the front side of the motorcycle 100, can be selected as the power source of the pressurizing/transferring mechanism 25A in the first hydraulic circuit 2, and the drive mechanism 103B, which is disposed in the rear side of the motorcycle 100, can be selected as the power source of the pressurizing/transferring mechanism 25B in the second hydraulic circuit 3. With such a configuration, the length and the like of the transmission pipe 104d can be reduced. Thus, the space that needs to be secured in the body side of the motorcycle 100 is reduced.

The description has been made so far on the first embodiment to the fourth embodiment. However, the invention is not limited to the description of each of the embodiments. For example, only a part of each of the embodiment may be implemented, or all or parts of the embodiments may be combined.

REFERENCE SIGNS LIST

1: Brake system
2: First hydraulic circuit
3: Second hydraulic circuit
4: Handlebar lever
5: Front brake caliper
6: Front rotor
7: Foot pedal
8: Rear brake caliper
9: Rear rotor
11: Master cylinder
12: Reservoir
13: Wheel cylinder
14: Primary channel
15: Secondary channel
21: Inlet valve
22: Outlet valve
23: Accumulator
24: Check valve
25, 25A, 25B: Pressurizing/transferring mechanism
25a: Cylinder
25b: Piston
25c: Cylinder
26: Check valve
27: Restrictor
28, 28A, 28B: Transmitted power control mechanism
31 to 38: Base body
31a to 35a, 31b to 38b: Partial channel
31c to 33c, 36c to 38c: Transmission channel
41 to 44: Brake fluid pipe
50: Brake fluid pressure control unit
51: Controller
100: Motorcycle
101: Front wheel
102: Rear wheel
103, 103A, 103B: Drive mechanism
104, 104A, 104B: Transmission mechanism
104a: Cam
104b: Cylinder
104c: Piston
104d: Transmission pipe
105: Rear suspension
110: Trunk section
120: Turning section
121: Front fork
121a: Front fork upper end
121b: Front suspension
121c: Front fork lower end
130: Coupling section
131: Swing arm

The invention claimed is:

1. A motorcycle comprising:
a brake system including at least one hydraulic circuit having a primary channel for communicating between a master cylinder and a wheel cylinder; a secondary channel for releasing a brake fluid in the primary channel,
and a brake fluid pressure control unit comprising
an inlet valve provided in the primary channel;
an outlet valve provided in the secondary channel;
a pressurizing/transferring mechanism provided on a downstream side of the outlet valve in the secondary channel and configured to pressurize and transfer the brake fluid in the secondary channel; and
a controller for executing a fluid pressure control operation of the brake fluid in the wheel cylinder, and
a drive mechanism,
wherein a power source of the pressurizing/transferring mechanism is the drive mechanism of the motorcycle, the drive mechanism being driven in a state where the fluid pressure control operation by the controller is not executed,
wherein power of the drive mechanism is transmitted to the pressurizing/transferring mechanism via a transmission mechanism including a transmission pipe that is filled with a transmission fluid,
wherein the motorcycle further comprises a transmitted power control mechanism configured to control the power transmitted by the transmission mechanism, and
wherein the transmitted power control mechanism is a valve configured to control distribution of the transmission fluid.

2. The motorcycle according to claim 1, wherein
the brake system includes:
a first hydraulic circuit as the hydraulic circuit that acts on a front wheel of the motorcycle; and
a second hydraulic circuit as the hydraulic circuit that acts on a rear wheel of the motorcycle, and
members for configuring the first hydraulic circuit and members for configuring the second hydraulic circuit are provided in different base bodies.

3. The motorcycle according to claim 2, wherein
compared to the base body that is provided with the members for configuring the second hydraulic circuit, the base body that is provided with the members for configuring the first hydraulic circuit is disposed in a front side of the motorcycle.

4. The motorcycle according to claim 3, wherein
the base body that is provided with the members for configuring the first hydraulic circuit is disposed in a turning section that turns with the front wheel of the motorcycle.

5. The motorcycle according to claim 3, wherein
the base body that is provided with the members for configuring the second hydraulic circuit is disposed in a lower portion of a trunk section of the motorcycle or a coupling section that couples the trunk section and the rear wheel of the motorcycle.

6. The motorcycle according to claim 2, wherein
compared to a drive mechanism that serves as a power source of the pressurizing/transferring mechanism in the second hydraulic circuit, a drive mechanism that serves as a power source of the pressurizing/transferring mechanism in the first hydraulic circuit is disposed in the front side of the motorcycle.

7. The motorcycle according to claim 1, wherein
a combination of the inlet valve and the outlet valve and the pressurizing/transferring mechanism in the at least one hydraulic circuit are provided in different base bodies.

8. The motorcycle according to claim 7, wherein
the base body that is provided with the inlet valve and the outlet valve is disposed under a spring of the motorcycle.

9. The motorcycle according to claim 1, wherein
the drive mechanism is at least one of an engine, a wheel, a power source of a suspension, and a starter motor.

* * * * *